United States Patent [19]

Mirtain et al.

[11] E Re. 30,549

[45] Reissued Mar. 24, 1981

[54] PNEUMATIC TIRE

[75] Inventors: Henri J. Mirtain, Compiegne, France; Jonathan Mishory, Birmingham, Mich.

[73] Assignees: Uniroyal, Inc., Middlebury, Conn.; Uniroyal S.A., Clairoix, France

[21] Appl. No.: 953,653

[22] Filed: Oct. 23, 1978

Related U.S. Patent Documents

Reissue of:

[64] Patent No.: 3,976,115
Issued: Aug. 24, 1976
Appl. No.: 489,687
Filed: Jul. 18, 1974

[51] Int. Cl.[3] ..... B60C 9/22

[52] U.S. Cl. ..... 152/361 R; 152/209 R; 152/352 R; 152/354 R

[58] Field of Search ..... 152/361 R, 209 WT, 209 D, 152/209 R, 353 R, 352 R, 360, 154, 354

[56] References Cited

U.S. PATENT DOCUMENTS

| | | | |
|---|---|---|---|
| 1,189,223 | 7/1916 | Albrecht | 152/209 WT |
| 1,337,660 | 4/1920 | Killen | 152/209 WT |
| 2,237,819 | 4/1941 | Hawkinson | 152/352 X |
| 2,781,815 | 2/1957 | Davis | 152/209 R |
| 3,044,519 | 7/1962 | Wright | 152/187 |
| 3,450,182 | 6/1969 | Verdier | 152/352 |
| 3,606,921 | 9/1971 | Crawey | 152/360 |
| 3,697,364 | 10/1972 | Boustany et al. | 152/361 R |
| 3,773,096 | 11/1973 | Masson | 152/374 |

FOREIGN PATENT DOCUMENTS

| | | | |
|---|---|---|---|
| 264891 | 10/1963 | Australia | 152/353 R |

*Primary Examiner*—John J. Love
*Assistant Examiner*—Donald W. Underwood
*Attorney, Agent, or Firm*—Jack Posin

[57] ABSTRACT

A belted pneumatic tire is disclosed in which an annular protuberance projects axially from the buttress region on each side of the tire. The protuberances are positioned radially inward of the tire tread and the lateral edges of the belt or breaker extend into the protuberances such that the breaker edges are removed from the vicinity of the tread-ground contact patch to thereby improve uniformity and edge separation problems. A relatively wide breaker having a low cross-sectional curvature is also utilized to thereby provide firm support to the tread and consequent improved performance characteristics.

5 Claims, 5 Drawing Figures

PNEUMATIC TIRE

Matter enclosed in heavy brackets [ ] appears in the original patent but forms no part of this reissue specification; matter printed in italics indicates the additions made by reissue.

BACKGROUND OF THE INVENTION

This invention relates to pneumatic tires and more particularly to a pneumatic tire having a wide reinforcing breaker or belt extending into an annular protuberance in the buttress region of the tire.

The tread reinforcement component commonly referred to as a belt or breaker is disposed between the tread and the carcass in the crown region of the tire. Typically, a breaker or belt is constructed of one or more plies of rubberized cord fabric. Each cord in the fabric is generally of a substantially non-extensible material such as metallic wires or strands, glass filaments, or rayon filaments. The cords within the breaker plies are oriented parallel to each other and substantially parallel to the plane of the beads and thus circumferentially of the tire, or at a small bias angle. In a single ply breaker construction, the small bias angle can be 0°. Where the breaker is a multi-ply structure, however, the small bias angle is in the range of about 15°–30° with respect to the median equatorial plane of the tire, and may be oppositely disposed in successive plies.

The development of a reinforcing belt or breaker for use in pneumatic tires added a number of benefits to tires including considerable improvement to tire durability. On the other hand, the breaker also introduced some new problems of its own. The lateral edges of a breaker in a typical tire, due to their location between the tire tread and carcass at a position of continually changing stress, tend to separate from the carcass or themselves. Improper positioning of the breaker results in the uniformity problems of increased lateral force variation and conicity.

Another benefit of a reinforcing breaker is improved tread wear due to the greater stiffness imparted to the tire tread. Of course, this benefit is enhanced by utilizing a "flat" tread having no convex cross-sectional curvature so that the relative movement between the center portion of the tread and the axially outward portions is minimized thereby resulting in an even wear pattern. A serious drawback of a tread designed to have no convex cross-sectional curvature lies in the fact that a tire which is vulcanized with such a shape, when cured, may inflate to a concave tread cross-section rather than a flat cross-section. Elimination of this problem can be accomplished by constructing and vulcanizing the tire such that the tread has at least a small convex cross-sectional curvature, that is, a large crown radius ratio, when the cured tire is inflated to its rated inflation pressure.

In the detailed description of the invention following hereinafter, the cross-sectional curvature of the tread and breaker of the tire are discussed in terms of "crown radius ratio" and "crown radius." The term "crown radius" as used herein either with respect to the tread or breaker, means the radius of the arc of a circle which best approximates the arc of curvature of the tread surface or the breaker as the case may be of a tire. The crown radius is commonly determined by the formula $$\frac{\frac{(\text{leg set})^2}{4} + (\text{shoulder drop})^2}{2 \times \text{shoulder drop}}$$

where "leg set" is the axial distance measured along a line tangent to the tread or breaker at its midpoint between the shoulders of the tread or edge of the breaker, or predetermined points axially equidistance inward of the shoulders or breaker edges. Shoulder drop is the perpendicular distance from the aforementioned tangent line to the tread shoulders or said predetermined points. In the case of a breaker, shoulder drop may be considered as the perpendicular distance between the line tangent to the breaker at its midpoint and the edges of the breaker. The "crown radius ratio" is the ratio of the crown radius of either the tread or breaker to the nominal cross-sectional width of the tire and as used herein is expressed in terms of percent.

Either a belted radial or a belted bias tire construction is suitable for use in the present invention. The radial type tire is, however, the preferred embodiment. A radial tire is inclusive of various tire constructions which typically comprise a carcass or body having one or more reinforcement plies of cord fabric extending from bead to bead wherein the cords in each ply are substantially radial in orientation, that is, the cords are oriented substantially normal to the beads and the crown centerline of the tire. In a single ply radial tire construction, the carcass cords normally have a 90° bias angle, that is, in the unshaped carcass they extend perpendicular to the planes of the beads. In a two-ply radial tire construction, the cords in each carcass ply are parallel to the cords in the other carcass ply. However, the cords in each ply may be oriented at oppositely disposed angles of 70° or more with respect to the median equatorial plane of the tire and thus the angle between cords in different plies is between 0° and 40°. In more than two ply radial ply tire constructions, similar cord arrangements in successive carcass plies is usually employed.

With regard to the prior art, U.S. Pat. No. 3,450,182 discloses a tire having a flat tread cross-section, wide protuberances extending beyond the width of the tire sidewalls, a tread surface in normal engagement with the ground between the lateral edges of the protuberances and a breaker extending laterally beneath the tread to positions adjacent the edges of the protuberances. This patent does not, however, disclose a breaker having its lateral edges removed from the stress area of contact by the tread with the ground or a convex cross-sectional tread curvature facilitating the manufacture of a tire. Moreover, the extreme lateral extension of the protuberances beyond the tire sidewall will result in a high degree of tread shoulder wear and breaker separation due to centrifugal force moving the protuberances radially outward during tire rotation.

In U.S. Pat. No. 2,477,754, an aircraft tire is shown in which a tread and breaker have a substantial convexly curved cross-section when the tire is inflated and the breaker has edges positioned within protuberances extending from the side of the tire. When this tire is loaded (but not impacted), the tread-ground contact area is in the crown area of the tread only and consequently the tread wear and traction of the tire will be relatively poor. Moreover, when the tire is subject to the normal type of impaction and very heavy loading which aircraft tires receive, the lateral edges of the breaker rotate through the tread-ground contact area to cause edge separation of the breaker. A further defect in the tire of U.S. Pat. No. 2,477,754 is that the circumferential breaker cords along the lateral sides of the breaker will carry the entire breaker load under deflection so that these breaker cords will break after a small amount of such use.

SUMMARY OF THE INVENTION

It is an important object of the present invention to provide an improved pneumatic tire having a construction which overcomes the aforementioned disadvantages.

It is a further object of this invention to provide a tire having a breaker and characterized by a high degree of uniformity and resistance to edge separation and a high amount of traction.

It is another object of the invention to provide a tire construction having a radially convex cross-sectional curvature which can be reliably attained during manufacture of the tire and which provides an optimum disposition of contact between the tire tread and the ground as the tire rotates.

It is another object of the invention to provide a tire construction having a high degree of hazard resistance.

It is yet another object of this invention to provide a tire construction having an auxiliary tread or other pattern in the buttress region of the tire normally out of engagement with the ground and engaging the ground only under predetermined conditions such as in mud or snow, during low inflation or after wear of the main tread surface to a predetermined level.

In general, the objectives of the invention are accomplished by the provision of a pneumatic tire having an annular protuberance in each buttress region, a wide breaker having its lateral edges extending into the protuberances and a cross-sectional curvature of the tread and breaker such that a maximum amount of the tread surface engages the ground when the tire is inflated and loaded.

The protuberances are normally out of engagement with the ground so that placing the breaker edges in the protuberances removes the edges from the treadground contact area. This results in the minimization of breaker edge separation and the elimination of tire uniformity problems due to improper placement of the breaker. A tread and breaker with a small amount of radially outward curvature, that is, convex curvature, facilitates manufacture of the tire and permits an optimum disposition of the tread to thereby enhance the wearing properties of the tire. Placing the edges of the breaker in the protuberances assists in attaining the low breaker curvature and consequently the improved tread wear.

BRIEF DESCRIPTION OF THE DRAWINGS

The foregoing and other objects and features of the present invention will be more clearly understood from the following detailed description thereof when read in conjunction with the accompanying drawings, in which.

DESCRIPTION OF THE PREFERRED EMBODIMENT

Figure 1:
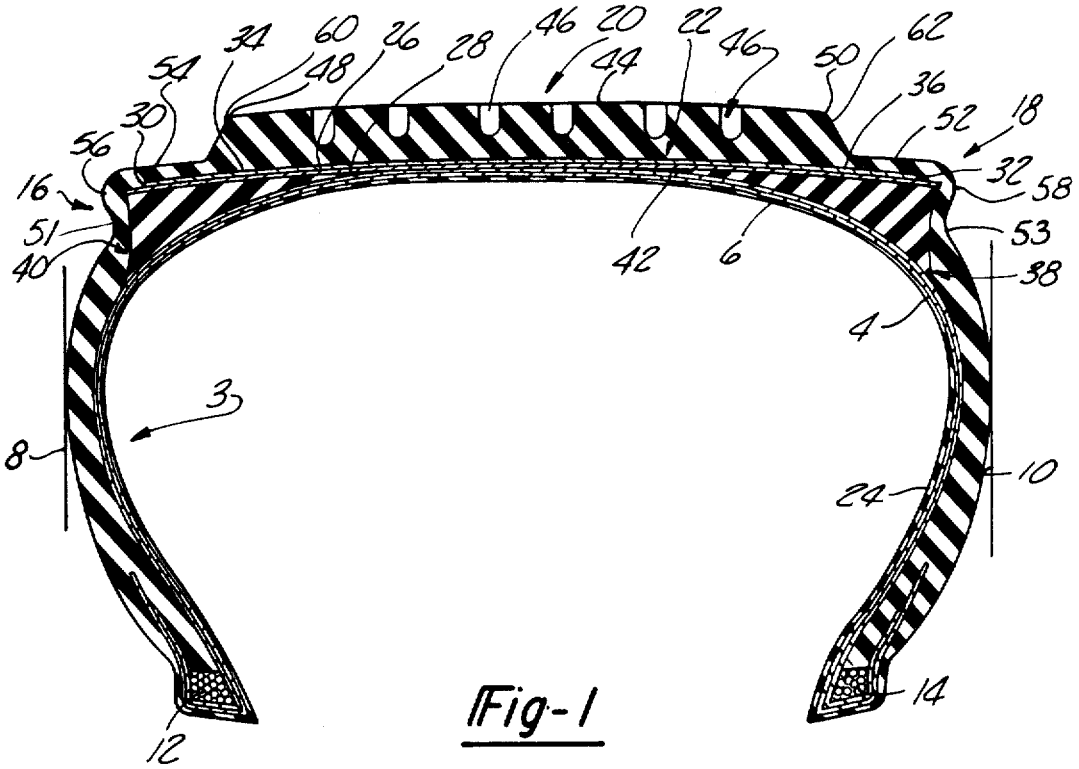
FIG. 1 is a cross-sectional elevation view of a pneumatic tire in accordance with this invention.

Referring generally to the drawings, there is illustrated a tire 2 including a carcass 3 having two radial or substantially radial superposed carcass plies 4 and 6, sidewalls 8 and 10 overlying the respective lateral regions of the carcass and terminating at their radially inwardmost edges in a pair of beads 12 and 14. It may be noted that the planes tangential to the widest points on the sidewalls 8 and 10 preferably define the maximum width of the tire 2, however, it is not intended that the tire be limited to a maximum width defined only by the sidewalls. Moreover, the term "sidewall" is considered herein to include any variations in the sidewall such as a buffing rib, raised letters or other figures, and sculptured patterns or designs in the sidewall. A tread 20 overlies the crown region of the carcass and a pair of buttress regions 16 and 18 are positioned between and connect the tread 20 and sidewalls 8 and 10. The buttress regions 16 and 18 respectively have continuous, annular protuberances 56 and 58 extending axially or laterally from the tire, i.e., in a direction away from the median equatorial plane of the tire. A breaker ply 22 having breaker layers 26 and 28 for providing reinforcing support to the tread 20 is disposed between the crown region of the carcass 3 and the tread 20. The breaker ply 22 includes lateral sides 34 and 36 and has lateral edges 30 and 32 extending into the protuberances 56 and 58 in an axial direction, i.e., in a direction away from the median equatorial plane of the tire. A fluid-impervious liner 24 is located radially inward of the carcass 3 and extends from bead 12 to bead 14. A pair of insert supports 38 and 40 are interposed between sides 34 and 36 of the breaker ply 22 and the carcass 3. The tread 20 includes a tread surface 44, a plurality of grooves 46 and shoulders 48 and 50 which respectively define the line of connection between buttress region 16 and tread 20 and buttress region 18 and tread 20.

Describing the cord ply components of the tire 2 in a radially outward direction, carcass plies 4 and 6 are layers of rubberized cords or cables made of any suitable natural or synthetic fiber such as nylon, rayon, polyester, metal wire, glass fiber, etc., and each of the carcass plies 4 and 6 extends from bead to bead. In the carcass plies illustrated, the cords in each carcass ply are oriented at oppositely disposed small and normally equal angles of up to about 20° with respect to true radial planes. Thus the respective carcass plies have bias angles of between 70° and 90° with respect to the median equatorial plane of tire 2. The breaker layers 26 and 28 are layers of rubberized, parallel reinforcing elements which preferably are metal cords such as steel, but can also be cords of other high modulus material such as rayon, glass fiber or Kevlar. The cord reinforcing elements in each breaker ply are preferably oriented at, but not limited to, a substantial bias angle of between about 15° and 30° to the median equatorial plane of the tire. However, the breaker layer reinforcing elements may be at an angle of substantially 0° to the median equatorial plane of the tire and may be of the type in which the cords are wound onto the carcass of the tire.

Figure 5:
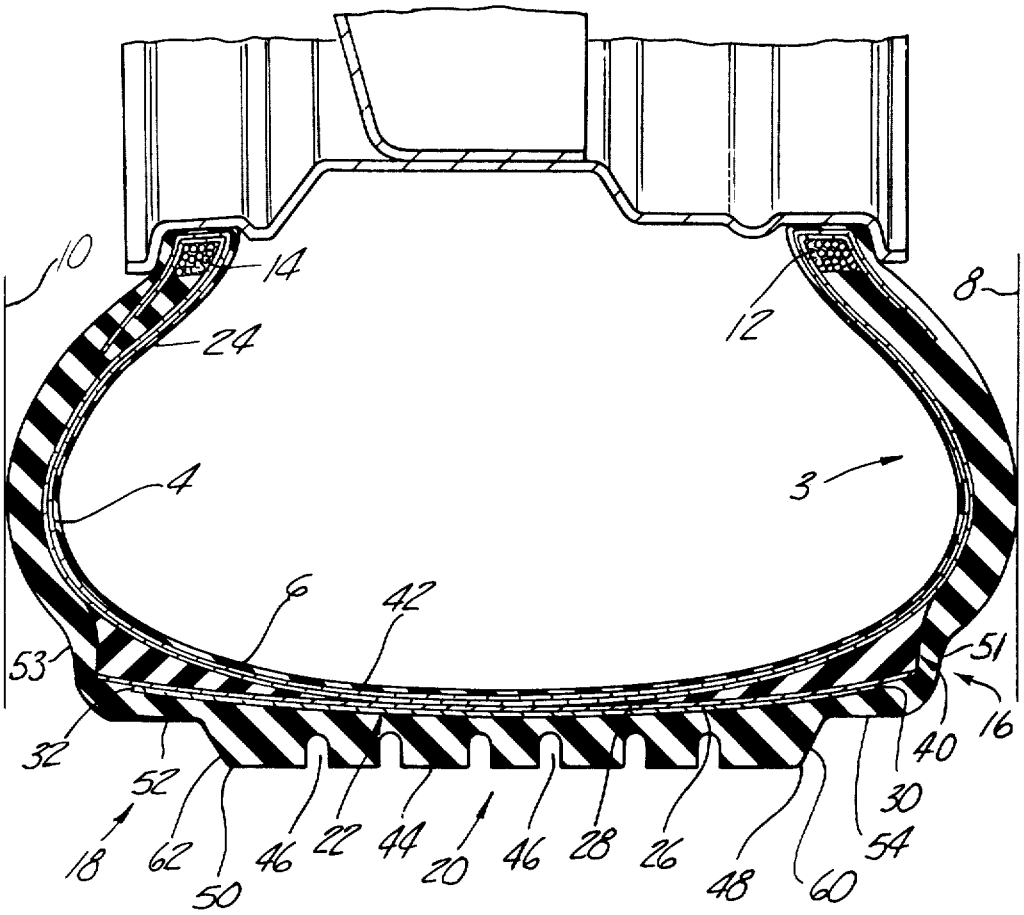
FIG. 5 is cross-sectional elevation view showing the tire of FIG. 1 in an inflated, normally loaded condition.

Referring now to FIGS. 1 and 5, the extension of the edges 30 and 32 of the breaker ply 22 in an axial direction into the protuberances 56 and 58 and the positioning of the protuberances 56 and 58 such that they do not normally contact the ground or road surface during normal operation and maximum rated loading of the tire effectively removes the edges 30 and 32 from the area between the carcass 3 and the tread-ground contact patch as the tire rotates. The width of the tread-ground contact patch is defined by the shoulders 48 and 50 of the tread 20 and, as can be seen in FIGS. 1 and 5, the breaker ply edges 30 and 32 are axially outward of the shoulders 48 and 50 and thus the contact patch. One of the advantages of this construction is elimination of the well known effect of improper positioning of the breaker and variations in the breaker edges on the uniformity of the tire. Another advantage of this construction is the removal of the breaker ply edges from the high stress area radially inward of the contact patch due to the repetitive loading and unloading of the tire tread as it rotates through the tread patch. The effect of this stressing is to subject the breaker ply edge to continuous movement and high heat, particularly at high speed, and ultimately cause its separation from the carcass. In order to obtain this advantage, it is important that the width of the breaker ply 22 be greater than the width of the tread 20. The width of the tread 20 is not greater than 80% of the maximum cross-sectional width of the tire and may be 68% to 72% of the nominal cross-sectional width of the tire. Thus, the breaker ply 22 should be greater than the width of the tread of a particular tire as designated above, and may be as wide as 95% of the width of the tire.

It is advantageous for a tread to have a low cross-sectional curvature, i.e., a large crown radius ratio, in that the tread will thereby have a more optimally shaped contact patch with the ground or road. Such a contact patch is one in which the entire leading edge of the contact patch simultaneously engages the ground as the tire rotates. This type of road contact results in increased tread wear resistance and therefore increased tire mileage. For the same reason, a breaker ply should have a large crown radius ratio and preferably a crown radius ratio which positions the cross-section of the breaker parallel to the tread. The breaker ply may, however, have a crown radius ratio larger than that of the tread. The location of the protuberances 56 and 58 on the buttress regions 16 and adjacent to the tread 20 permits not only a wide breaker ply but also one which can have a large crown radius ratio. Stating the cross-sectional curvature of the tread 20 in terms of crown radius ratio, the tread may have a crown radius ratio of 120 to 400% and a preferable optimum value of 180%. The breaker 22 should have a crown radius ratio of between 100 and 400% and a preferred optimum value such that the breaker is parallel to the tread surface.

As previously indicated, the breaker ply 22 may comprise cords wound at substantially 0° to the median equitorial plane of the tire 2. A drawback of substantially 0° breaker plies is that they tend to make a tire unstable in a forward rolling direction when the tire is subjected to lateral forces. Increasing the width of such 0° breakers decreases this problem, however, as the width of the breaker plies increases, their cross-sectional curvature typically also increases. The result is that upon deflection of the breaker radially inward, the entire tire load is transferred to the axially outward breaker cords which are not deflected so that these cords are quickly weakened and break. The use of a protuberance in the butress region of a tire 2 permits an extra wide breaker and at the same time allows the breaker to have a high crown radius ratio. Consequently, the present problems of 0° wound breakers will be minimized in the breaker ply 22 when it utilizes substantially 0° wound cord reinforcing elements.

The edges of a breaker ply positioned axially within the width of the tread of a tire are located at one of the regions of higher breaker ply stress. Removal of the breaker ply edges 30 and 32 axially outside of the tread width into protuberances 16 and 18 removes the edges from the high stress region. However, a region of high stress on the breaker ply 22 continues adjacent to the areas located by the edges of the contiguous width of the breaker ply 22 and carcass 2. This contiguous width is defined by the axially 3, circumferential edges 42 and 44 of the insert supports 38 and 40 and also by the points along the cross-section of the breaker ply 22 and carcass 3 where the crown radii of the latter are substantially equal. As the tread 20 rotates through the tread contact patch, the change in stress on the breaker ply 22 will tend to cause separation of the breaker ply 22 from the carcass 3 at the edges of the contiguous width of the latter two tire components. The aforementioned width of contiguity is centered on the median equatorial plane of the tire and is preferably, but not necessarily, 25 to 60% of the cross-sectional width of the tire.

Figure 2:
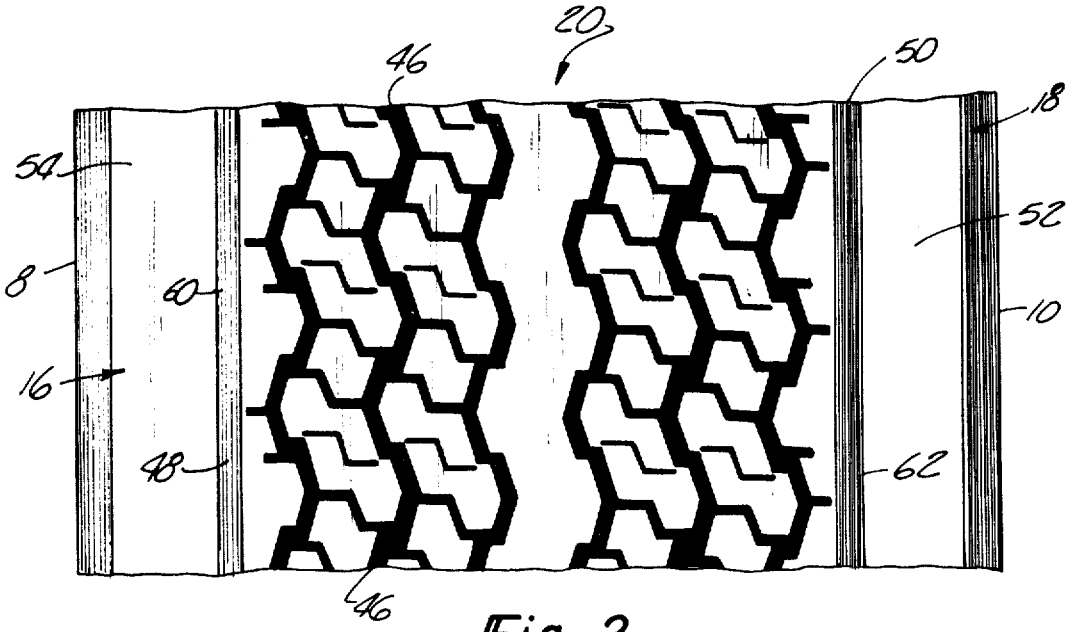
FIG. 2 is a plan view of a section of the tire of FIG. 1 showing the tire tread and viewing the tire in a direction radially inward toward the axis of the tire.

With reference to FIGS. 1, 2 and 5, the protuberances 56 and 58 respectively have radially inward surfaces 51 and 53 and radially outward continuous circumferential surfaces 54 and 52 positioned radially inward of the surface 44 of tread 20. The surfaces 54 and 52 are substantially parallel to the axis of the tire 2, as shown in FIGS. 1 and 5, but may be inclined toward the shoulders 48 and 50 of the tread 20. It is critical, however, that the surfaces 54 and 52 are not inclined such that they connect directly to the tread 20 at shoulders 48 and 50 but rather join the buttress surfaces 60 and 62 radially inward of the shoulders 48 and 50. In effect, this construction provides a decoupling of the protuberances 16 and 18 from the tread 20 such that the protuberances do not also distort and deflect with the tread 20 as the tread goes into and comes out of the tread-ground contact patch. The rubber that forms the surfaces 54 and 52 preferably has a dynamic modulus greater than 100 $kg/cm^2$ and a tensile strength greater than 160 $kg/cm^2$. This rubber may also be reinforced with floc material such as steel, Kevlar, polyester, fiberglas or other suitable organic or inorganic material.

Figure 3:
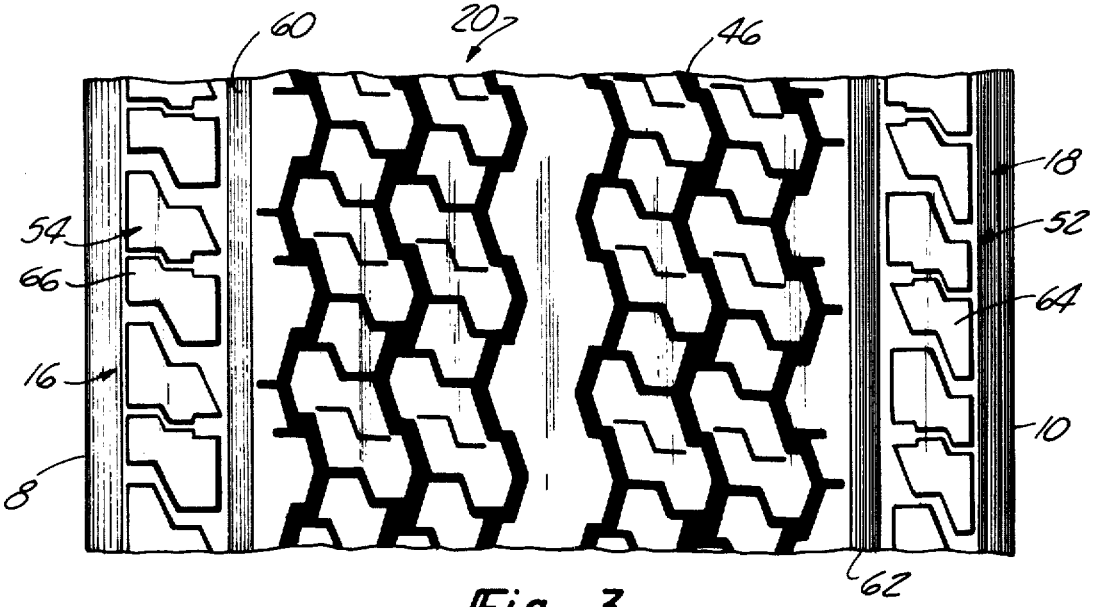
FIG. 3 is a view similar to that of FIG. 2 showing another embodiment of the invention.
Figure 4:
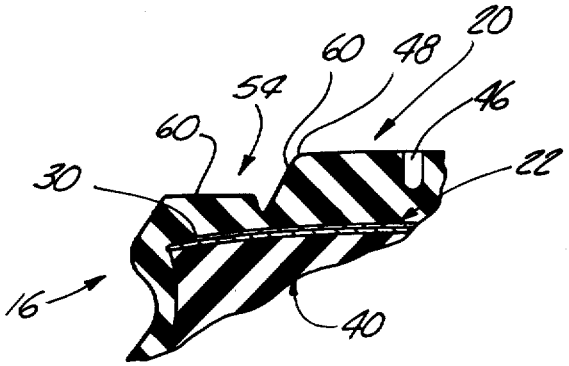
FIG. 4 is a cross-sectional elevation, broken away, showing a portion of the tire embodiment of FIG. 3

As shown in FIG. 3, the surfaces 52 and 54 of protuberances 18 and 16 may have formed in them a sculptured design which may be an additional tread 64 suitable for extra traction in floatation situations such as in snow and mud. Also, the tread 64 may be of a design which creates a high level of noise or vibration while rotating on the road surface and which, due to its radially inward position relative to tread 20 as shown in FIG. 4, becomes operative only under low inflation conditions of the tire 2 or after the tread 20 has worn to a level such that tread 64 engages the road surface. The vibration or noise generated will be discernible to the vehicle operator such that he can correct the problem indicated. It should be emphasized, however, that the tread 64 is radially inward of tread surface 44 and does not normally engage the road.

It will be understood that the foregoing description of the preferred embodiment of the present invention is for purposes of illustration only, and that the various structural and operational features as herein disclosed are susceptible to a number of modifications and changes none of which entail any departure from the spirit and scope of the present invention as defined in the hereto appended claims.

What is claimed is:

1. A pneumatic tire comprising a cord reinforced carcass, a tread overlying the crown region of said carcass, a reinforcing breaker *having a cross-sectional curvature along its entire width only in a radially inward direction for all normal operating conditions of said tire and* comprising a plurality of rubberized layers interposed between said tread and the crown region of said carcass, each layer having parallel cords oriented at an angle in the range of greater than 0° to 30° relative to the median equatorial plane of the tire, the angle of the cords in each layer being opposed relative to the angle of the cords in another layer, first and second buttress regions disposed radially inward of and adjacent to the respective first and second shoulders of the tread, first and second axially directed annular protuberances formed in the corresponding first and second buttress regions, each of said protuberances having a radially external surface positioned radially inward of the surface of said tread while the tread is in engagement with the road surface in a non-flotation situation and the tire is carrying normal load and in normal operation including straight line running, cornering or breaking, and the lateral side edges of the cords in each layer of said reinforcing breaker extend into said protuberances.

[2. The tire of claim 1 wherein the tread has a width and the lateral side edges of the reinforcing breaker are positioned axially outside of the tread width.]

[3. The tire of claim 1 wherein said radially outward surfaces of the protuberances are disposed radially inward of the grooves in said tread.]

[4. The tire of claim 1 wherein the cords in each layer of said reinforcing breaker are oriented at an angle in the range of 15° to 30° relative to the median equatorial plane of the tire.]

[5. The tire of claim 1 wherein the edges of each reinforcing breaker layer extend into a protuberance in an axial direction beyond the width of the surface of said tread a distance in the range of about 9% to 12% of the cross-sectional width of the tire.]

[6. The tire of claim 1 wherein, said tire has first and second sidewalls defining the maximum width of the tire, said tread has first and second shoulders defining the width of the tread, said first protuberance is disposed in an axial direction between the first shoulder and the first sidewall and the second protuberance is disposed in an axial direction between the second shoulder and the second sidewall, said breaker has a width in the range of 85% to 100% of the maximum width of the tire.]

[7. The tire of claim 1 wherein the reinforcing breaker has a crown radius ratio of 100 to 400%.]

[8. The tire of claim 7 wherein the reinforcing breaker has a crown radius ratio of about 180%.]

[9. The tire of claim 1 wherein said protuberances each have a radially outward surface disposed radially inward of the surface of said tread, each of said surfaces having a rectilinear projection when viewed in cross-section, said rectilinear projection having an angle in the range of 0° to 10° relative to the axis of the tire, said angle being inclined radially outward in the direction of said tread when greater than 0°.]

[10. The tire of claim 9 wherein said radially outward surfaces comprise rubber having a modulus greater than 100 kg/cm$^2$ and a tensile strength greater than 160 kg/cm$^2$.]

11. A pneumatic tire comprising a cord reinforced carcass, a tread overlying the crown region of said carcass, a reinforcing breaker interposed between said tread and the crown region of said carcass and having parallel cords oriented at an angle in the range of 0° to 30° relative to the median equatorial plane of the tire, said breaker having a crown radius ratio of 100% to 400% and being contiguous to the carcass over a range of 25% to 60% of the cross-sectional width of the tire, first and second buttress regions disposed radially inward of and adjacent to the respective first and second shoulders of the tread, first and second axially directed annular protuberances formed in the corresponding first and second buttress regions, each of said protuberances having a radially external surface positioned radially inward of the surface of said tread while the tread is in engagement with the road surface in a non-flotation situation and the tire is carrying normal load and in normal operation including straight line running, cornering or braking, and the lateral side edges of said reinforcing breaker extend into said protuberances.

12. A pneumatic tire comprising a cord reinforced carcass, a tread overlying the crown region of said carcass and having a width of less than 80% of the cross-sectional width of the tire, a reinforcing breaker interposed between said tread and the crown region of said carcass, said breaker having a width of at least 85% of the cross-sectional width of the tire and having parallel cords oriented at an angle in the range of 0° to 30° relative to the median equatorial plane of the tire, said breaker having a crown radius ratio of 100% to 400% and being contiguous to said carcass along a width of at least 40% of the cross-sectional width of the tire, first and second buttress regions disposed radially inward of and adjacent to the respective first and second shoulders of the tread, first and second axially directed annular protuberances formed in the corresponding first and second buttress regions, each of said protuberances having a radially external surface positioned radially inward of the surface of said tread while the tread is in engagement with the road surface in a non-flotation situation and the tread is carrying normal load and in normal operation including straight line running, cornering or braking, and the lateral side edges of said reinforcing breaker extend into said protuberances.

[13. A pneumatic tire comprising a cord reinforced carcass, a tread overlying the crown region of said carcass, a reinforcing breaker interposed between said tread and the crown region of said carcass and having parallel cords oriented at a angle in the range of 0° to 30° relative to the median equatorial plane of the tire, first and second buttress regions disposed radially inward of and adjacent to the respective first and second shoulders of the tread, first and second axially directed annular protuberances formed in the corresponding first and second buttress regions, each of said protuberances being continuous along a buttress region and having a radially external surface positioned radially inward of the surface of said tread while the tread is in engagement with the road surface in a non-flotation situation and the tire is carrying normal load and in normal operation including straight line running, cornering or braking, each of said surfaces having a sculptured tread design formed therein, and the lateral side edges of said reinforcing breaker extend into said protuberances.]

[14. The tire of claim 13 wherein said radially external surfaces comprise rubber having a modulus greater than 100 kg/cm$^2$ and a tensile strength greater than 160 kg/cm$^2$.]

[15. A pneumatic tire comprising a cord reinforced carcass, a tread overlying the crown region of said carcass and having first and second shoulders defining the maximum width of the tread, a reinforcing breaker comprising a plurality of rubberized layers interposed between said tread and the crown region of said carcass, each layer having parallel cords oriented at an angle in the range of greater than 0° to 30° relative to the median equatorial plane of the tire, the angle of the cords in each layer being opposed relative to the angle of the cords in another layer, first and second sidewalls attached to the carcass and defining the maximum width of the tire, first and second buttress regions connected to and disposed radially outward of the sidewalls and radially inward of and adjacent to the respective first and second shoulders of the tread, first and second annular protuberances formed in the corresponding first and second buttress regions and extending axially from said buttress regions, the first protuberance being disposed in its entirety between a plane parallel to said median equatorial plane and passing through the first shoulder and a plane tangential to the first sidewall at the maximum width point of the tire and the second protuberance being disposed in its entirety between a plane parallel to said median equatorial plane and passing through the second shoulder and a plane tangential to the second sidewall at the maximum width point of the tire, each of said protuberances having a radially external surface positioned radially inward of the surface of said tread while the tread is in engagement with the ground and the tire is carrying normal load, and the lateral side edges of the cords in each layer of said reinforcing breaker extend into said protuberances.]

16. A pneumatic tire comprising a cord reinforced carcass, a tread overlying the crown region of said carcass, a reinforcing breaker *comprising a plurality of rubberized layers* interposed between said tread and the crown region of said carcass and having *a cross-sectional curvature along its entire width only in a radially inward direction for all normal operating conditions of the tire, each layer of the reinforcing breaker having* parallel cords oriented at an angle in the range of 0° to 30° relative to the median equatorial plane of the tire, *the angle of the cords in each layer being opposed relative to the angle of the cords in another layer,* first and second sidewalls attached to the carcass and defining the maximum width of the tire, first and second buttress regions connected to and disposed radially outward of the sidewalls and radially inward of and adjacent to the respective first and second shoulders of the tread, first and second annular protuberances formed in the corresponding first and second buttress regions and extending axially between the planes tangential to the sidewalls at the maximum width of the tire, each of said protuberances having a radially external surface positioned radially inward of the surface of said tread while the tread is in engagement with the ground and the tire is carrying normal load, the lateral side edges of *each layer of* said reinforcing breaker extend into said protuberances, said buttresses each having a surface positioned radially outward of a protuberance, and first and second recesses each formed by a buttress surface and a radially external surface of the protuberance whereby deformation of the tread is decoupled from each protuberance and the [breaker edge] *edges of the breaker layers* located in the protuberances.

[17. The tire of claim 16 wherein said protuberances each have a radially inward surface, and further comprising first and second sidewalls attached to said carcass, and third and fourth recesses each formed by a radially inward surface of a protuberance and one of said sidewalls whereby deformation of each sidewall is decoupled from the adjoining protuberance and the breaker edge located in the protuberance.]

*18. A pneumatic tire comprising a cord reinforced carcass, a tread overlying the crown region of said carcass, a reinforcing breaker having a substantially constant direction of curvature along its entire width and comprising a plurality of rubberized layers interposed between said tread and the crown region of said carcass, each layer having parallel cords oriented at an angle in the range of greater than 0° to 30° relative to the median equatorial plane of the tire, the angle of the cords in each layer being opposed relative to the angle of the cords in another layer, first and second buttress regions disposed radially inward of and adjacent to the respective first and second shoulders of the tread, first and second axially directed annular protuberances formed in the corresponding first and second buttress regions, each of said protuberances having a radially external surface positioned radially inward of the surface of said tread while the tread is in engagement with the road surface in a non-flotation situation and the tire is carrying normal load and in normal operation including straight line running, cornering or breaking, and the lateral side edges of the cords in each layer of said reinforcing breaker extend into said protuberances.*

* * * * *